Nov. 28, 1967 H. R. BEURRIER ET AL 3,355,681
ELASTIC WAVE SYSTEM TEMPERATURE CONTROL
FOR CONTROLLING DELAY TIME
Filed March 22, 1965 2 Sheets-Sheet 1

INVENTORS H. R. BEURRIER
A. H. FITCH
BY
ATTORNEY

United States Patent Office 3,355,681
Patented Nov. 28, 1967

3,355,681
ELASTIC WAVE SYSTEM TEMPERATURE CONTROL FOR CONTROLLING DELAY TIME
Henry R. Beurrier, Chester Township, Morris County, and Arthur H. Fitch, Mountain Lakes, N.J., assignors to Bell Telephone Laboratories, Incorporated, New York, N.Y., a corporation of New York
Filed Mar. 22, 1965, Ser. No. 441,622
7 Claims. (Cl. 333—16)

ABSTRACT OF THE DISCLOSURE

A temperature controlled delay line in which the heat produced by dissipation of elastic wave energy is used to regulate the line temperature. The control energy can be provided by a separately generated wave or by regulation of the level of the signal wave. Delay control via temperature is therefore obtained based either on direct temperature measurement, direct relay measurement or upon some other standard.

---

This invention relates to elastic wave delay devices and more particularly to the means by which the temperature therein is controlled by elastic wave energy.

Solid elastic wave delay lines are frequently employed in applications requiring precise control of delay. Since the delay media most often used have nonzero temperature coefficients of delay, the lines must typically be housed in temperature controlled ovens or associated with distributed heaters regulated by a wide varietp of electrical control devices. The difficulty in either of these systems is that the heat is generated at best only at the surface of the delay medium. This means that the time required for the surface heat to stabilize the temperature of the medium is relatively long. Furthermore, during the time in which the temperature is stabilizing, the acoustic properties of the medium are nonuniform and are capable of distorting the main elastic signal propagating through the line.

It is therefore an object of the invention to control and stabilize the temperature of a solid body delay medium.

In accordance with the invention it has been recognized that the inherent dissipation of elastic wave energy propagating along a delay line path will produce an appreciable amount of heat that is proportional to the total quantity of elastic energy in the medium and is distributed throughout the volume thereof according to its pattern. Compared to the relatively long time constant required for thermal stabilization with the surface generated heat of the prior art, heat generated in accordance with the invention is generated throughout the volume almost instantaneously. The elastic wave signal used for temperature control can transit the same or different path from the main signal, may be the same or different type of vibration and may reside in the same or different frequency band. In accordance with one feature of the invention the control signal may in fact be identical to the main signal since it is the net level of elastic wave energy within the medium that determines the heat.

Since the heat produced in accordance with the invention in turn determines the delay time of the path, it is a further object of the invention to control and stabilize delay time by control of the elastic wave energy level within the delay medium.

These and other objects the nature of the present invention and its various advantages and features will appear more fully upon consideration of the specific illustrative embodiments shown in the accompanying drawings and described in detail in the following explanation of these drawings, in which.

Figure 1:
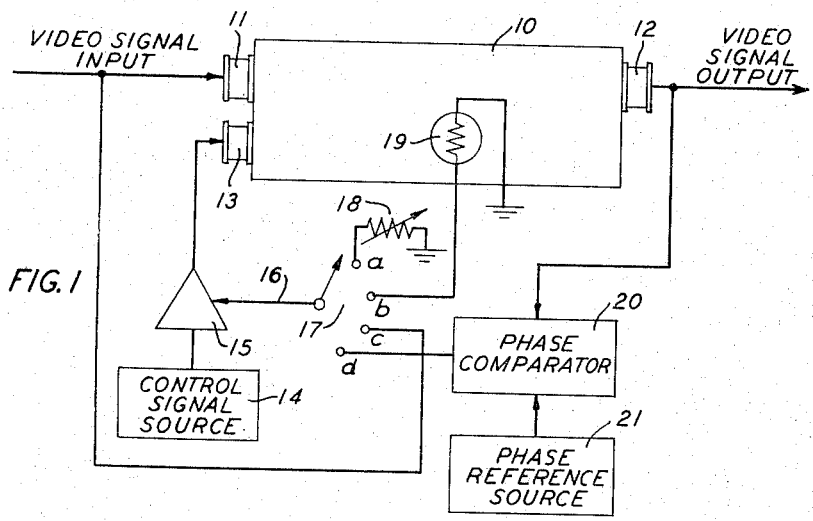
FIG. 1 is a block diagram schematic of the components making up the invention in accordance with several useful applications thereof.

Referring more particularly to FIG. 1, an illustrative embodiment of the invention is shown as it might be incorporated for controlling the temperature and delay of a conventional delay line system. For example, the delay line comprises an elongated body 10 having any convenient cross sectional shape and formed from any suitable elastic wave transmission material having an elastic wave delay time that varies as a function of temperature such as glass, vitreous silica, or a metal alloy of grain size small compared to the wavelength of the elastic wave to be supported.

Means are provided at the left and right ends, respectively, for converting the elastic, intelligence bearing or video signal to be delayed into an elastic wave in body 10 and in turn for coupling an elastic wave from body 10 to an electrical output load. These means may be piezoelectric ceramic, piezoelectric crystal or magnetic transducers 11 and 12 bonded to the ends of body 10 so that when input transducer 11 is exicted by an alternating voltage, an elastic wave of any desired mode or polarization is launched in body 10 to travel therein toward the opposite end where the vibrations generate an electrical signal in output transducer 12.

Since the travel time depends both upon the path length and the velocity of elastic wave energy, the delay time is affected by ambient temperature variations on both the velocity coefficient of temperature and the expansion coefficient of temperature. Because of this even specially developed delay line materials utilizing unusual modes of propagation have not been able to meet the extremely precise control required in recent delay line application. Furthermore, in those applications in which the energy level of the applied signal is not constant, variations in temperature caused by the elastic wave heating itself have been appreciable even when the ambient temperature is held constant.

In accordance with the invention, temperature control is maintained by launching in body 10 a second elastic wave from transducer 13 which has an energy level varied to produce the desired delay of the main video signal from transducer 11. As illustrated, the temperature controlling signal is derived from source 14 and applied to transducer 13 through an amplifier 15, the gain of which is controlled, as schematically indicated by lead 16, by an impedance or voltage connected or applied to lead 16. Details of such control amplifiers are well known in the art.

As illustrated, transducer 13 directs the temperature control signal along substantially the same path as the video signal and discrimination therefrom is obtained by employing a mode of propagation to which output transducer 12 is insensitive. Alternatively or in addition thereto, the frequency of the control signal may be outside the band of the video signal, or if the video signal is intermittent, the control signal may "time share" with it. Furthermore, the control signal may be launched from a transducer extending longitudinally along all or part of the length of body 10 so that the signal travels transversely to the path of the video signal. Either uniform heating along this length or selective heating localized to portions thereof can be obtained. Multiple reflections of the temperature control signal are permissible and even desirable, as they produce a more efficient conversion from elastic wave energy into heat.

By way of illustrating alternative modes of operation, a switch 17 is included to apply different indications to lead 16. When switch 17 is in the *a* position, a variable resistor 18 is connected in the circuit to control lead 16 to vary the gain of amplifier 15 which in turn controls the intensity of elastic wave energy developed in body 10 by transducer 13, the temperature of body 10 and ultimately the delay introduced to the video signal. Thus, an extremely sensitive vernier control of the delay time may be obtained. Obviously, resistor 18 is merely symbolic of any desired source of a control signal to vary the gain of amplifier 15.

When switch 17 is in the *b* position, lead 16 is connected to a thermistor or thermocouple 19, physically associated with body 10 to sense its temperature. Thus, the elastic wave delay through body 10 is held substantially constant by maintaining the temperature thereof constant by the feedback action from thermistor 19 through amplifier 15 to determine the energy level of elastic wave energy in body 10. For example, if ambient temperature should increase, thermistor 19 reduces the gain of amplifier 15, reducing the level of energy in body 10 to minimize the variation of temperature of body 10.

When switch 17 is in the *c* position, the heating effect of the input intelligence signal is determined indirectly by sensing its amplitude and regulating the amplitude of the control signal launched by transducer 13 inversely with respect to the amplitude of the input such that the net energy level in line 10 remains constant. Such an arrangement is particularly useful in an application in which the input is intermittent and absence of the signal for any period of time would allow body 10 to cool, altering the desired delay for a subsequent application of the signal.

When switch 17 is in the *d* position, a direct detection of changes in delay is made. Thus, the phase of the output video signal is compared in phase comparator 20 with any suitable source 21 of phase reference signals. For example, in a system in which the vedieo signal is in the form of a train of pulses, source 21 may be the system generator of clocking pulses. The output of comparator 20 on lead 16 is initially adjusted for a given output signal phase relationship and any tendency to change from this relationship will be corrected by the feedback action described above.

Figure 2:
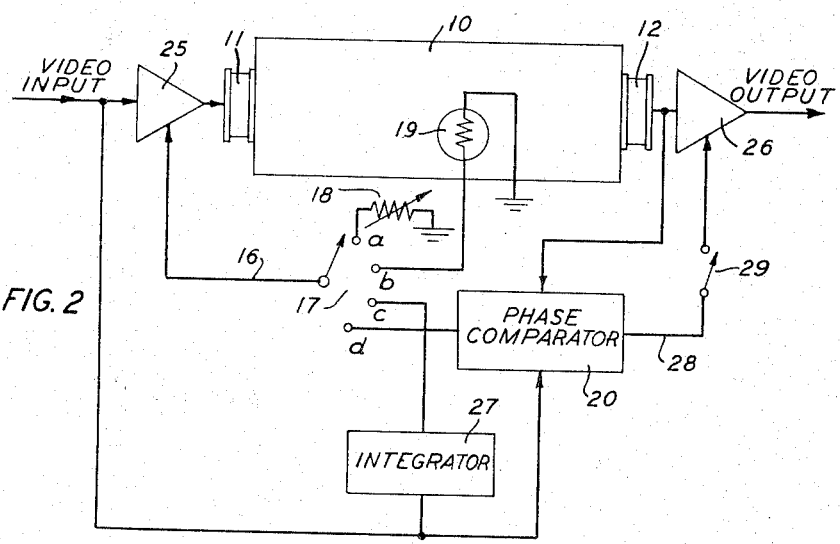
FIG. 2 is a block diagram schematic illustrating the modifications of FIG. 1 required for further application of the invention.

FIG. 2 illustrates further modifications of the general combination of FIG. 1 and corresponding reference numerals have been used to designate corresponding components. Modification will be seen to reside in the fact that control amplifier 25 is located directly in the video path and that no separate source of temperature control elastic wave energy is employed. Thus, when switch 17 is placed in either the *a*, *b* or *c* position, the gain of amplifier 25 corrects the energy level of elastic waves produced by transducer 11 to correct the heating effect of this energy and the total delay time in the same manner as described with reference to FIG. 1. In position *c* an integrator 27 is preferably included in the circuit so that amplifier 25 corrects only the average level of the signal.

Further modification is seen in the fact that when switch 17 is placed in the *d* position, comparator 20 compares the phase of the output with the input video signal rather than with some other phase reference. A further refinement in FIG. 2 is represented by the inclusion of variable gain amplifier 26 in the output. When switch 29 is closed, a control signal from the comparator 20 on lead 28 that is out of phase with the control signal on lead 16 is applied to amplifier 26 to counteract the change in gain produced by amplifier 25.

Figure 3:
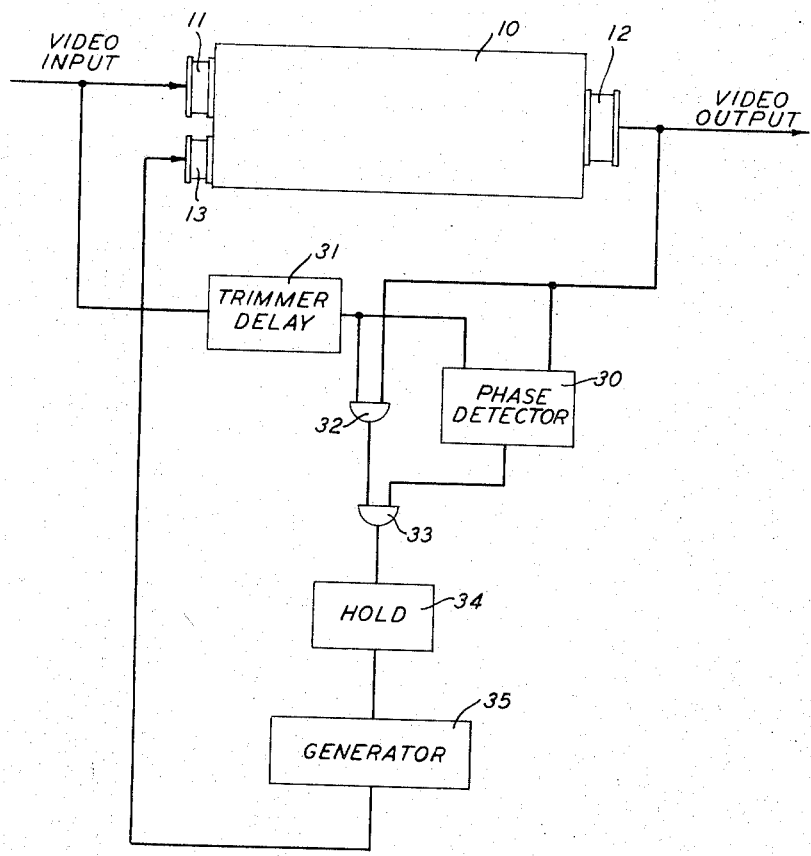
FIG. 3 is a block diagram schematic illustrating one application of the invention to a system containing digital information.

The embodiment shown in FIG. 3 has been particularly adapted for use in a digital system in which the presence or absence of a pulse in a particular time slot (representing a "1" or "0" respectively in accordance with the conventional nomenclature of this art) conveys the desired information. In such a system the presence of a large number of characters of one kind followed by a large number of the other kind can cause extreme and undesirable temperature excursions. The principles of the present invention are applied to equalize the resulting delay time variations.

The nature of this kind of pulse train, however, prohibits a direct comparison between the input and output pulses without logic circuitry to eliminate ambiguous pulse comparisons. Thus, in FIG. 3 the input pulses are fed to phase detector 30 through a "trimmer" delay 31 located at any suitable point in the circuit. In cases where the delay is an even multiple of the pulse interval time the trim delay can be omitted. The delayed pulses are then compared with the input pulse in phase detector 30 which produces a positive or negative pulse proportional to the time error of its inputs and poled according to the direction of the error.

To eliminate the effects of ambiguous time error pulses which result when a 0-1, 0-0 or 1-0 combination is compared, AND gate 32 develops an output in the presence of any of these combinations which when applied to AND gate 33 blocks the error pulse from phase detector 30. The valid error signal is passed to holding circuit 34 only when a 1-1 combination is compared. The function of the holding circuit 34 is to maintain a constant output to the temperature control signal generator 35 until a new and valid error signal is received. Thus, once a valid time delay error is detected, a long period of comparisons other than 1-1 will not cause the system to interpret the condition as if no error in fact existed. The operation and the nature of other components in the system of FIG. 3 are identical to those described above and corresponding reference numerals have been employed to designate corresponding components.

It should be understood that the control circuits herein have been illustrated in their simplest form and that more sophisticated schemes involving stages of intermodulation, pulse shaping, integration and rectification might be employed in a particular application.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. In combination, an elastic wave transmission medium having a delay time which varies as a function of the temperature thereof, means for varying the delay time of an intelligence bearing elastic wave signal upon said medium in a predetermined direction by control of the temperature of said medium including means for varying the net level of elastic wave energy within said medium in accordance with said predetermined direction to vary said temperature.

2. The combination according to claim 1 wherein said means for varying said net level includes means for introducing a second elastic wave signal within said medium having a level which varies in accordance with said predetermined direction.

3. In combination, an elastic wave transmission medium having a parameter of delay time which varies as a function of the parameter of temperature thereof, means for controlling said delay time by control of the temperature of said medium including means for sensing variations in one of said parameters, and means for varying said temperature by varying the net level of elastic wave energy within said medium in response to said sensed parameter.

4. In combination, an elastic wave transmission medium having a delay time which varies as a function of temperature thereof, means for controlling said delay time including means for sensing variations in said temperature and means for varying the net level of elastic wave energy within said medium inversely in response to said sensed variation to minimize said temperature variations.

5. In combination, an elastic wave transmission medium having a delay time which varies as a function of the temperature thereof, means for controlling the delay time of an intelligence bearing elastic wave signal upon said medium including means for sensing variations in said temperature and means for introducing a second elastic wave signal within said medium having a level which varies inversely to said sensed temperature.

6. In combination, an elastic wave transmission medium having a delay time which varies as a function of the temperature thereof, means for controlling the delay time of an intelligence bearing elastic wave signal upon said medium by control of said temperature comprising means for sensing variations in the relative phase of said signal entering and leaving said medium and means for varying the net level of elastic wave energy within said medium in response to said sensed phase.

7. The combination according to claim 6 wherein said means for varying the net level of elastic wave energy within said line includes means for introducing a second elastic wave signal within said medium having a level which varies in response to said sensed phase.

References Cited
UNITED STATES PATENTS

| | | | |
|---|---|---|---|
| 3,165,721 | 1/1965 | Kennedy et al. | 333—29 X |
| 3,209,286 | 9/1965 | Eveleth | 333—29 X |

HERMAN KARL SAALBACH, *Primary Examiner.*

ELI LIEBERMAN, *Examiner.*

P. GENSLER, *Assistant Examiner.*